US012620857B2

(12) United States Patent
Neet et al.

(10) Patent No.: US 12,620,857 B2
(45) Date of Patent: May 5, 2026

(54) STATOR WINDING ARRANGEMENT WITH CONNECTIONS FOR ADJACENT DIAMOND COILS

(71) Applicant: BorgWarner Inc., Auburn Hills, MI (US)

(72) Inventors: Kirk Neet, Noblesville, IN (US); Matthew R. Conner, Franklin, IN (US); Joshua B. Lahrman, New Palestine, IN (US)

(73) Assignee: BorgWarner Inc., Auburn Hills, MI (US)

( * ) Notice: Subject to any disclaimer, the term of this patent is extended or adjusted under 35 U.S.C. 154(b) by 241 days.

(21) Appl. No.: 18/465,631

(22) Filed: Sep. 12, 2023

(65) Prior Publication Data

US 2025/0088056 A1     Mar. 13, 2025

(51) Int. Cl.
H02K 3/28 (2006.01)
(52) U.S. Cl.
CPC ...................................... H02K 3/28 (2013.01)
(58) Field of Classification Search
CPC .. H02K 3/18; H02K 3/52–522; H02K 15/022; H02K 15/062; H02K 15/095; H02K 21/16
See application file for complete search history.

(56) References Cited

U.S. PATENT DOCUMENTS

| | | | |
|---|---|---|---|
| 10,651,700 B2 | 5/2020 | Koga | |
| 10,666,104 B2 | 5/2020 | Koga | |
| 2008/0201935 A1 | 8/2008 | Nakayama et al. | |
| 2022/0329116 A1 | 10/2022 | Neet et al. | |
| 2024/0022132 A1* | 1/2024 | Sakuragi | F04B 35/04 |
| 2024/0322629 A1* | 9/2024 | Wu | H02K 3/14 |

* cited by examiner

*Primary Examiner* — Oluseye Iwarere
*Assistant Examiner* — Minki Chang
(74) *Attorney, Agent, or Firm* — Maginot, Moore & Beck, LLP

(57)     ABSTRACT

A stator for an electric machine includes a winding arrangement including a plurality of parallel paths. Each parallel path includes a plurality of coils arranged on the core, each coil defined by coil legs and end turns, the coil legs including left legs and right legs extending through the slots of the core and arranged in layers within the slots. The left legs and right legs of each coil are connected by first end turns at one end of the core and second end turns at an opposite end of the core. The plurality of coils of each parallel path include a first pair of adjacent coils connected in series and a second pair of adjacent coils connected in series. Additionally, an extended coil connection connects the first pair of adjacent coils and the second pair of adjacent coils in series.

22 Claims, 8 Drawing Sheets
(7 of 8 Drawing Sheet(s) Filed in Color)

STATOR WINDING ARRANGEMENT WITH CONNECTIONS FOR ADJACENT DIAMOND COILS

FIELD

The present disclosure relates to the field of electric machines, and more particularly, stator winding arrangements.

BACKGROUND

Winding arrangements for stators are known, including winding arrangements with diamond-shaped coils. Electric machines that include such winding arrangements are particularly suited for certain applications, but improvements to such electric machines would be advantageous. For example, certain winding arrangements with coils positioned in adjacent slots require a many long connections between the poles of the winding arrangement. Accordingly, it would be advantageous to provide a winding arrangement with coils positioned in adjacent slots, but with and a limited/reduced number of long series connections between poles. Additionally, it would be advantageous to limit the number of welds required for the diamond coil winding arrangement and/or make the welds easy to complete. It would be of additional advantage to provide a balanced winding and/or a winding with a high slots per pole per phase count and multiple parallel paths per phase.

SUMMARY

In at least one embodiment, a stator for an electric machine defines a plurality of poles. The electric machine includes a core including a plurality of slots and a multi-phase winding arrangement formed of a plurality of diamond coils is positioned on the core. Each phase of the winding arrangement comprise at least three parallel paths. At least one of the parallel paths includes a plurality of coils arranged on the core, and each coil is defined by coil legs and end turns. The coil legs include left legs and right legs extending through the slots of the core and arranged in layers within the slots. The left legs and right legs of each coil are connected by first end turns at one end of the core and second end turns at an opposite end of the core. The plurality of coils of the one parallel path includes a first pair of adjacent coils connected in series and a second pair of adjacent coils connected in series, the first pair of adjacent coils and the second pair of adjacent coils associated with four poles of the electric machine. Additionally, an extended coil connection connects the first pair of adjacent coils and the second pair of adjacent coils in series. An entry lead is provided at one end of the parallel path and an exit lead is provided at the opposite end of the parallel path. At least two poles which are not associated with the parallel path, exist between the entry lead and the exit lead In at least one embodiment, a stator for an electric machine comprises a core including a plurality of slots and a multi-phase winding arrangement positioned on the core. Each phase of the winding arrangement comprises four parallel paths, each parallel path including at least a first pair of adjacent coils connected in series, a second pair of adjacent coils connected in series, and an extended connection connecting the first pair of adjacent coils and the second pair of adjacent coils in series. The first pair of adjacent coils are separated on the core from the second set of adjacent coils. The coils forming the first pair of adjacent coils and the second pair of adjacent coils are diamond shaped coil. Each of the four parallel path includes an entry lead and an exit lead, wherein the entry leads and the exit leads of all four parallel paths of each phase are arranged along an arc that spans at least 240 degrees around the core.

In at least one embodiment, a stator for an electric machine includes a core comprising a plurality of slots and a multi-phase winding arrangement positioned on the core. Each phase of the winding arrangement comprises a plurality of parallel paths. Each of the parallel paths is comprised of a plurality of adjacent coils connected in series. Each phase of the winding arrangement is associated with a plurality of poles and each pole is associated with a pole slot set including at least a leftmost slot, a middle slot, and a rightmost slot. For each pole slot set, (i) coil legs of a first parallel path are positioned in a first half of the layers of the leftmost slot and in the first half of the layers of the middle slot, and (ii) coil legs of a second parallel path are positioned in a second half of the layers of the middle slot and the second half of the layers of the rightmost slot.

The above described features and advantages, as well as others, will become more readily apparent to those of ordinary skill in the art by reference to the following detailed description and accompanying drawings. While it would be desirable to provide an electric machine that provides one or more of these or other advantageous features as may be apparent to those reviewing this disclosure, the teachings disclosed herein extend to those embodiments which fall within the scope of the appended claims, regardless of whether they include or accomplish one or more of the advantages or features mentioned herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION

Figure 5:
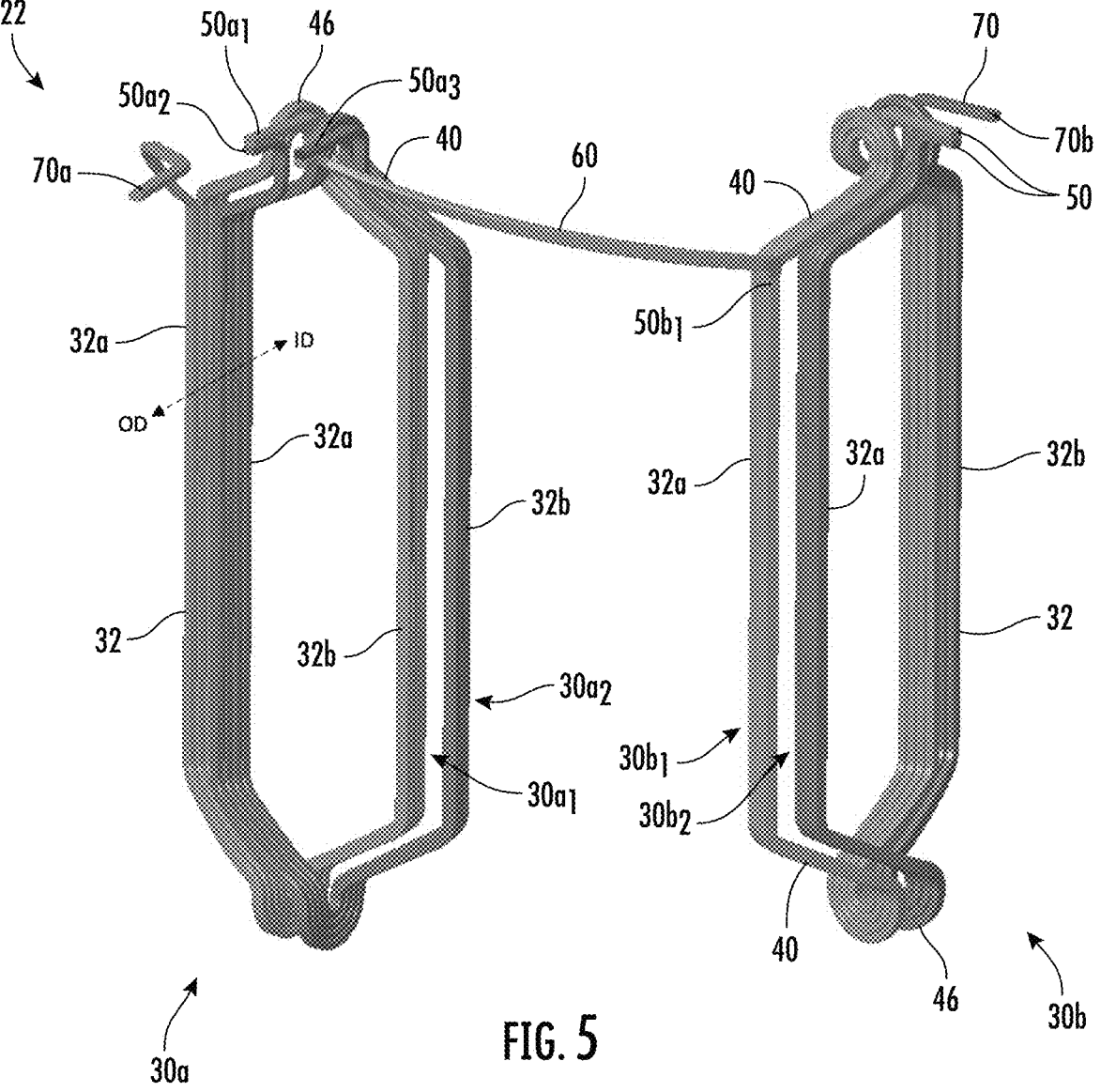
FIG. 5 shows a perspective view of one path of one phase of the winding arrangement of FIG. 1 in isolation from the stator core, wherein the coil leads extend radially outward.

A stator for an electric machine is disclosed herein. With general reference to FIGS. 1, 2 and 5, opposite sides of the stator 10 are shown. The stator 10 includes a stator core 12 with a multi-phase winding arrangement 20 positioned on the stator core 12. Each phase of the winding arrangement 20 includes a plurality of parallel-connected paths 22 (which may also be referred to herein as simply "parallel paths" or "paths"). The parallel paths are housed in groups of adjacent slots, wherein each group of adjacent slots and the associated conductors through such slots define one of a plurality of poles for the electric machine. As best shown in FIG. 5, each parallel path includes a plurality of coils 30 positioned on the core, and each coil is defined by in-slot conductors 32, end turns 40 that extend between the in-slot conductors 32, and coil leads 50. Each path 22 includes at least a first pair of adjacent coils 30a connected in series and a second pair of adjacent coils 30b connected in series. The first pair of adjacent coils 30a and the second pair of adjacent coils 30b are connected in series but are separated on the core such that they are not adjacent. Extended coil connections 60 provide the series connections between non-adjacent coils within the same path. The coil leads 50 and the extended coil connections 60 are all located on a first end 26 (i.e., the "lead end") of the stator core 12.

Stator Core

Figure 3:
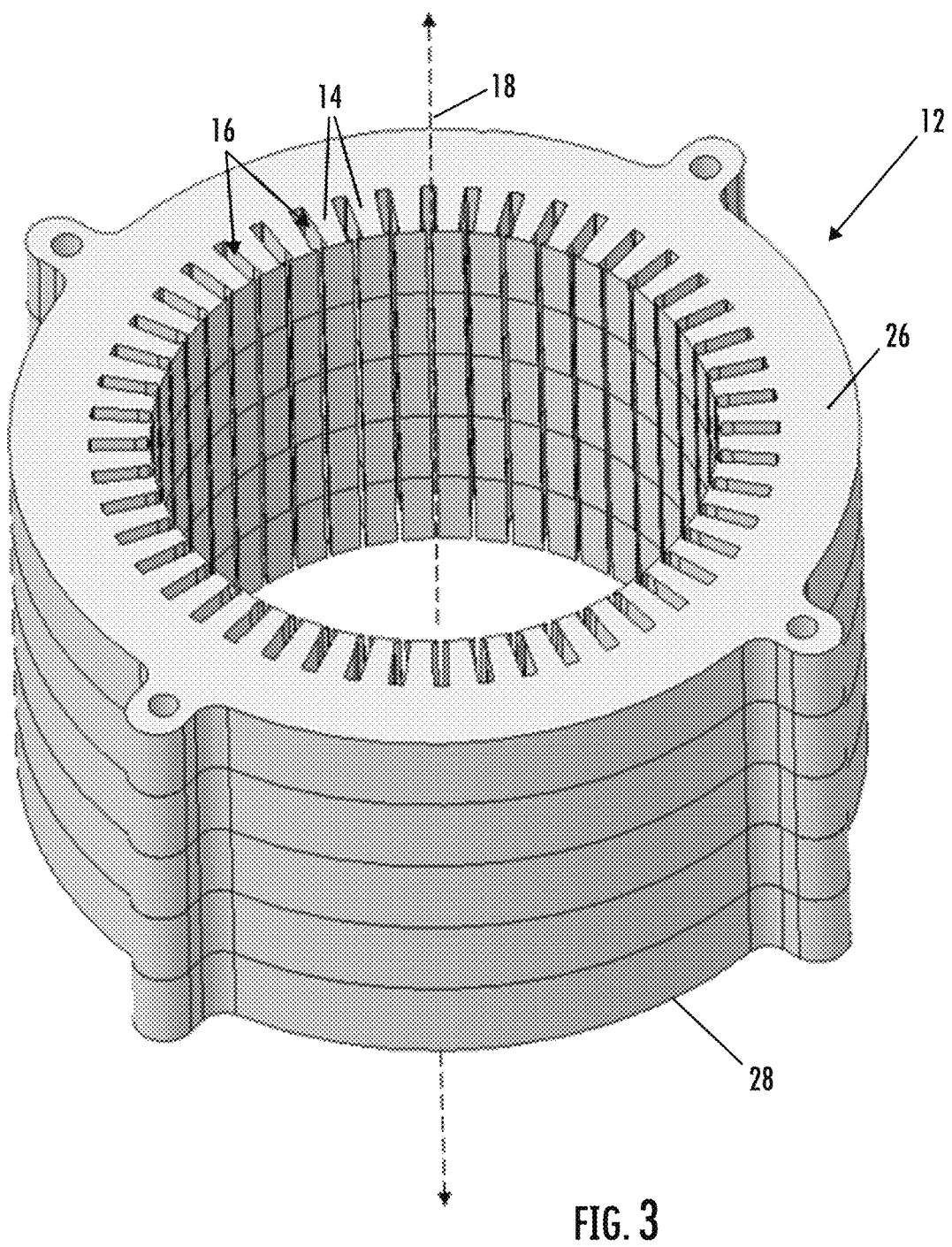
FIG. 3 is a perspective view of the stator core of FIG. 1 in isolation from the winding arrangement.

FIG. 3 shows a view of the stator core 12 in isolation from the winding arrangement 20. The stator core 12 is comprised of a ferromagnetic material and is typically formed from a plurality of steel sheets that are stamped and stacked upon one another to form a lamination stack, but also can be formed of any low-loss material such as SMC (Soft Magnetic Core). The stator core 12 is generally cylindrical in shape as defined by a center axis 18, and includes an inner perimeter surface and an outer perimeter surface. The inner perimeter surface defines an inner diameter (ID) for the stator. The outer perimeter surface defines an outer diameter (OD) for the stator.

A plurality of teeth 14 are formed on the interior of the stator core 12 and directed inwardly toward the center axis 18. Each tooth 14 extends radially inward and terminates at the inner perimeter surface. Axial slots 16 are formed in the stator core 12 between the teeth 14. Each slot 16 is defined between two adjacent teeth, such that two adjacent teeth form two opposing radial walls for one slot. The teeth 14 and slots 16 all extend from a first end 26 to a second end 28 of the core.

The slots 16 may be open or semi-closed along the inner perimeter surface of the stator core 12. When the slots 16 are semi-closed, each slot 16 has a width that is smaller at the inner perimeter surface than at more radially outward positions (i.e., slot positions closer to the outer perimeter surface). When the slots are open, conductors may be inserted into the slots from the ID. In addition to the radial openings to the slots 16 through the inner perimeter surface (i.e., for open and semi-closed slots), axial openings to the slots 16 are also provided the opposite ends 26, 28 of the stator core 12.

Figure 1:
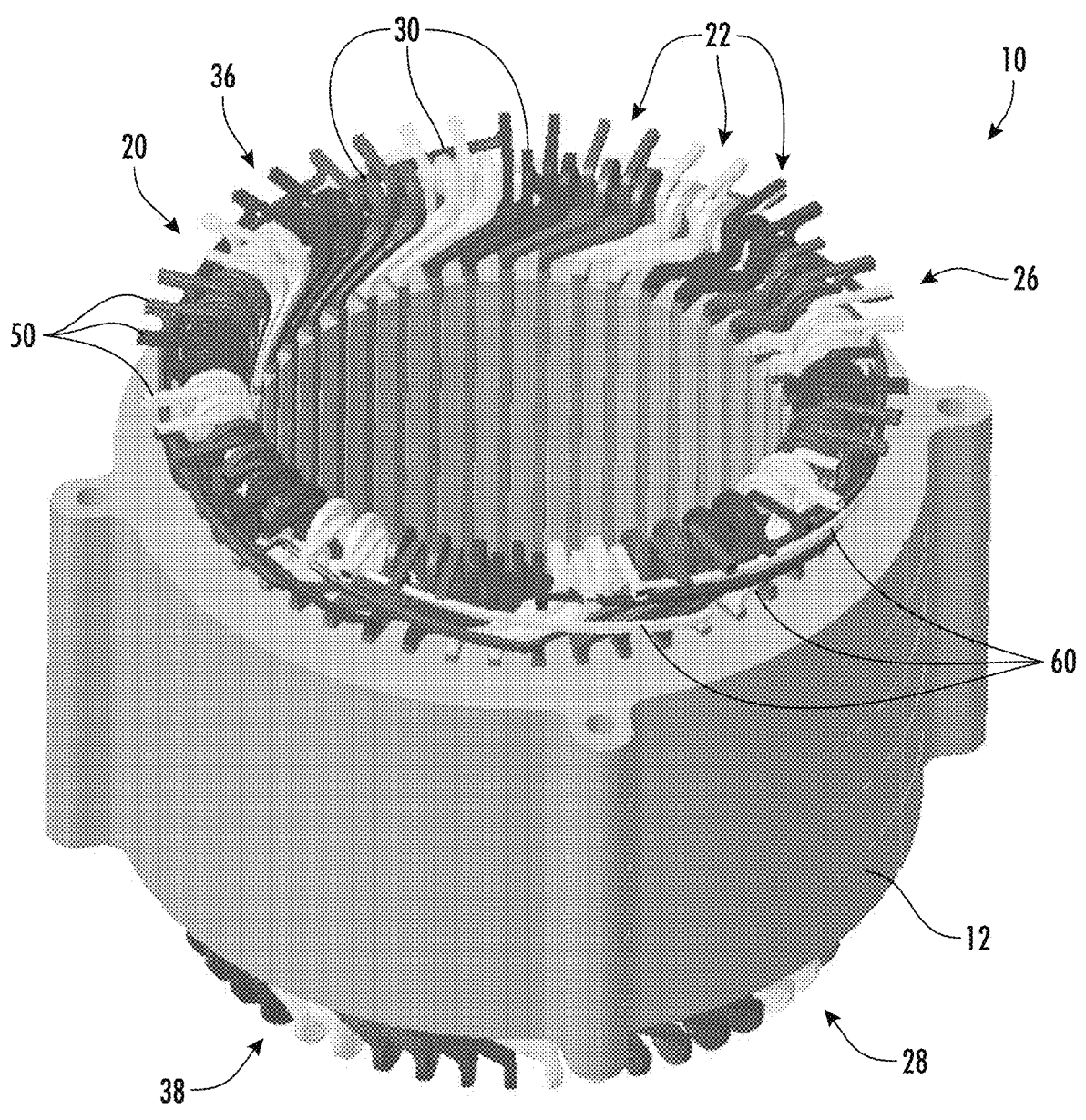
FIG. 1 is a perspective view of lead end of a stator including a diamond coil winding arrangement.

As shown in FIG. 1, the stator core 12 is configured to retain the winding arrangement 20 within the slots 16 of the stator core 12. The winding arrangement 20 is formed from a plurality of interconnected coils that are retained within the slots 16. The coils are comprised of multiple segments of insulated copper or other electrically conductive material that form loops. The loops generally extend through the slots and wrap around the teeth of the core.

Coils of Winding Arrangement

Figure 4:
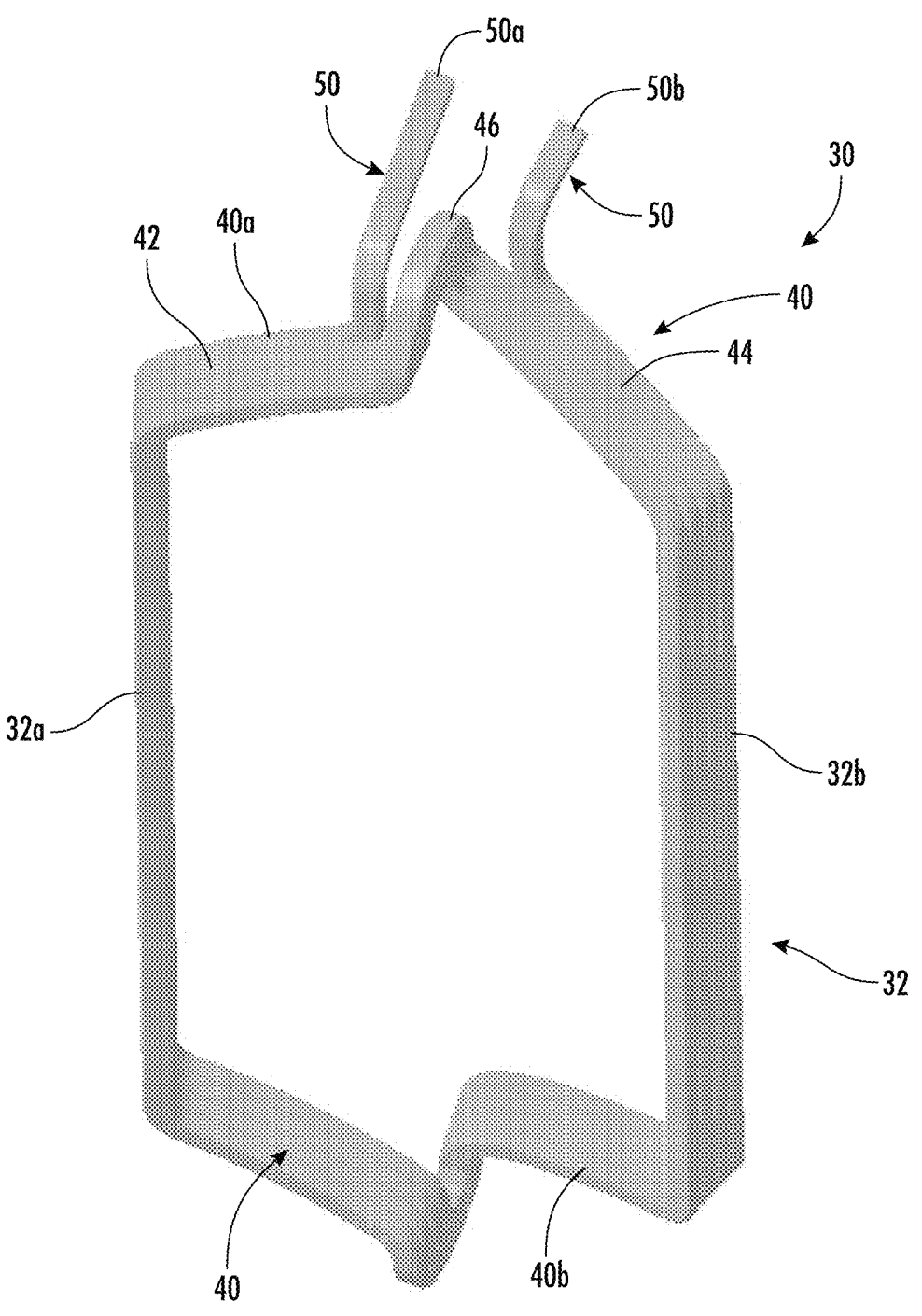
FIG. 4 is a perspective view of a diamond-shaped coil of the winding arrangement of FIG. 1, the coil including in-slot segments, end-turns, and coil leads.

With reference now to FIG. 4, one of the coils 30 of the winding arrangement 20 is shown in isolation from the winding arrangement. As shown in FIG. 4, each coil is a diamond-shaped coil that includes a plurality of straight in-slot conductors 32, a plurality of end turns 40, and a plurality of coil leads 50. The straight in-slot conductors 32 (which may also be referred to herein as "in-slot segments," "in-slot conductors" or "legs") extend through the slots 16 from one end of the core 12 to the opposite end of the core. Two groups 32a and 32b of in-slot segments 32 are associated with each coil 30. Each group 32a, 32b of in-slot segments 32 extends through a different slot of the core. Multiple in-slot segments are included in each group 32a, 32b. In the embodiment of FIG. 4, each group 32a, 32b includes four in-slot segments 32. These four in-slot segments are arranged in single file within the slots 16 (i.e., in "layers" of conductors within the slot). Each slot is configured to retain some number of in-slot segments in layers of the slot. In at least one embodiment, the slots 16 are configured to retain twice the number of in-slot segments 32 as the number of conductors of each group 32a, 32b (e.g., each group 32a, 32b includes four in-slot conductors 32, and each slot is configured with a total of eight layers of in-slot conductors).

In addition to the in-slot segments 32, each coil 30 further includes end turns 40 and coil leads 50. The end turns 40 and coil leads 50 are provided as part of winding heads 36 and 38 of the winding arrangement 20, and are therefore arranged axially beyond the respective ends 26, 28 of the stator core 12. As shown in FIG. 4, the end turns 40 (which may be also referred to herein as "end loops") extend between the two groups/sets 32a, 32b of in-slot segments. In other words, each end turn 40 provides a bridge from the end of a conductor in one group 32a to the end of a conductor in another group 32b. Each end turn 40 includes a first angled portion 42 (which may also be referred to herein as a "first segment") and a second angled portion 44 (which may also be referred to herein as a "second segment"). The first segment 42 extends along a first end turn direction that is angled relative to the axial direction (i.e., angled relative to center axis 18). Similarly, the second segment 44 extends along a second end turn direction that is angled relative to the axial direction. The two segments 42, 44 meet at a vertex 46 of the end turn. The vertex 46 defines the portion of the end turn where the coil 30 changes direction as it loops around the core (e.g., changing from a direction moving axially away from the core back to a direction moving axially toward to core). As shown in FIG. 4, the vertex 46 may be semi-circular shaped and may alternatively be referred to as a "U-turn" portion. As shown in FIG. 4, the angled portions 42, 44 of the coil 30 and the associated vertices 40 result in a coil with a diamond-like shape.

Similar to the in-slot segments 32, the end turns 40 are also comprised of a conductive material, such as copper. The diamond shape of the coils 30 may be formed by providing a length of insulated conductor that is wound into loops (i.e., "racetracks") that are subsequently spread apart to form the desired conductor shape. An example of such a process for forming the conductor coils is disclosed in co-pending U.S. patent application Ser. No. 17/716,144, filed Apr. 8, 2022, the entire contents of which are incorporated by reference herein Alternatively, in at least some embodiments, the in-slot segments 32 may be provided by I-pin conductors and the end turns 40 and coil leads 50 that are printed on the ends of the in-slot segments 32 after the I-pin conductors are inserted into the slots 16 of the core 12. An example of such a winding is disclosed in co-pending U.S. patent application Ser. No. 17/716,092, filed Apr. 8, 2022, the entire contents of which are incorporated by reference herein.

With continued reference to FIG. 4, each coil 30 includes two coil leads 50. Each coil lead 50 provides a path into or out of the looping portions of each coil 30. In other words, if the coil body is considered to include the in-slot segments 32 and the end turns 40 that form loops, the coil leads 50 provide a path leading to the coil body. FIG. 4 also shows the coils lead 50 in a "bent" or "angled" configuration because a portion of the coil lead 50 follows the angle of the end turn prior to extending away from the coil body in the radial direction near the vertex 46 of the end turn 40. However, in the embodiments disclosed herein some of the coils 30 may include a "straight" coil lead that extends in an axial direction instead of a radial direction or extends directly from the in-slot segments 32 and is not significantly angled like the segments 42, 44 of the end turn 40.

As will be recognized from the foregoing, the coil of FIG. 4 is a diamond-shaped coil 30 that includes a strand of wire that is wrapped in a loop to include a set of left legs 32a, a set of right legs 32b, first end turns 40a, and second end turns 40b. The set of four left legs 32a are all elongated in an axial direction and parallel to one another. Similarly, the set of four right legs 32b that are all elongated in an axial direction and parallel to one another (and also parallel to the left legs 32a). The first end turns 40a connect the right legs to the left legs at one end of the coil 30, and the second end turns 40b connect the right legs to the left legs at the opposite end of the coil 30. The legs are all connected in series such that a coil is formed, allowing electricity to flow from a first lead 50a at one end of the coil, through all of the legs, and to a second lead 50b at the same axial end of the coil 30.

Parallel Paths With Pairs of Adjacent Coils

The winding arrangement 20 of the stator includes a plurality of diamond shaped coils similar to that of FIG. 4 connected together to form a multi-phase winding having multiple parallel paths per phase. FIG. 5 shows a representative parallel path for one phase of the winding arrangement 20. The path includes a first pair of adjacent coils 30a and second pair of adjacent coils 30b connected in series by an extended coil connection 60 (which may also be referred to herein as a "connection segment"). The first pair of adjacent coils 30a includes a left coil $30a_1$ and a right coil $30a_2$, with the left coil $30a_1$ positioned in slots that are adjacent to the right coil $30a_2$. The second pair of adjacent coils also includes a left coil $30b_1$ and a right coil $30b_2$, with the left coil $30b_1$ positioned in slots that are adjacent to the right coil $30b_2$. The term "adjacent coils" as used herein refers to two coils (e.g., $30a_1$ and $30a_2$) having their left legs (e.g., legs 32a) arranged in adjacent slots 16 of the core 12 and right legs (e.g., legs 32b) also arranged in adjacent slots 16 of the core 12. The first pair of adjacent coils 30a are not adjacent to the second pair of adjacent coils 30b because none of the legs of the coils of the first pair of adjacent coils 30a are in adjacent slots on the core to those of the legs of the coils of the second pair of adjacent coils 30b. As shown in FIG. 5, the coil $30a_1$ and the coil $30a_2$ of the adjacent coils 30a are connected in series by a weld of lead $50a_1$ to lead $50a_2$, as shown in FIG. 5. In another embodiment, the coil $30a_1$ and the coil $30a_2$ can be formed of one continuous wire. The coil $30a_1$ and the coil $30a_2$ are housed in the same stator pole. The two coils $30b_1$ and $30b_2$ of adjacent coils 30b are connected in a similar manner.

The representative path shown in FIG. 5 is comprised of two sets of adjacent coils 30a and 30b, and includes in-slot conductors 32a, 32b, end turn segments 40, coil leads 50, connection segments 60, and path leads 70. As discussed above, the in-slot conductors 32a, 32b extend through the slots of the stator core 12 and the end turn segments 40 connect the legs of a given coil which are arranged in different slots. The coil leads 50 provide entry and exit nodes between coils and are thus used to connect different coils. Most of the coil leads 50 include a radial segment that extends radially outward from the end turns 40 and facilitates convenient welding or other connection of the coil leads radially outward from the end turns. However, as noted previously, some of the coil leads may be configured without a radial component. Also, in at least one alternative embodiment, all or most of the coil leads extend axially past the end turns are connection between the end turns is made at an axial end of the stator.

The connection segments 60 provide series connections between coils that are not adjacent (i.e., coils that are not located in adjacent slots of the core). Each connection segment 60 extends between two different coils and provides a series connection between a first pair of adjacent coils and a second pair of adjacent coils. The connection segment 60 is shown as a lead $50b_1$ of adjacent coils 30b bent circumferentially toward the lead $50a_3$ of adjacent coils 30a and the two leads $50a_3$ and $50b_1$ are welded together. In another embodiment, the connection segment 60 is a separate jumper wire with one end welded to lead $50b_1$ of adjacent coils 30b to lead 50 of adjacent coils 30a. In the embodiment disclosed herein, the connection segments 60 extend in a circumferential manner between the coils at a position that is radially outward from the end turns 40. Similar to the coils 30, the connection segments 60 are also comprised of insulated copper or another electrically conductive material that is typical in winding arrangements for electric machines.

As noted above, the plurality of path leads 70 are provided on the lead end 26 of the stator core along with the end turns 40, the coil leads 50, and the coil connections 60. The path leads 70 define the entry and exit conductors into each parallel path of the stator. While all of the path leads are difficult to identify in FIG. 1, FIG. 5 shows a representative parallel path of the winding arrangement 20 in isolation and clearly identifies two path leads 70a and 70b for the representative path. As discussed previously, each parallel path of the winding arrangement 20 is provided by two pairs of adjacent coils, including a first pair of series-connected adjacent coils 30a connected in series to a second pair of series-connected adjacent coils 30b by a coil connection 60. Two path leads 70a and 70b are provided for the parallel path as shown in FIG. 5. The path lead 70a may be considered the entry path lead (which may also be referred to herein as an "entry lead"), and path lead 70b may be considered the exit path lead (which may also be referred to herein as an "exit lead") (or vice-versa). In various embodiments, the path leads may be radially extending or axially extending from the lead end 26 of the stator 10. For example, the exit path lead 70b is shown as extending radially outward from the end turns 40 in FIG. 5. The entry path lead 70a extends in the axial and radial directions. Because the stator 10 is a three phase machine, and because there are four parallel paths per phase in the embodiment of FIGS. 1-6, a total of twenty-four path leads 70 are included in the winding arrangement (i.e., 3 phases×4 paths per phase=12 paths, the twelve paths including twelve entry path leads and twelve exit path leads summing to twenty-four total path leads). For a wye connected stator, twelve of the path leads 70 are neutral leads and twelve of the path leads 70 are phase leads.

Complete Winding Arrangement

The plurality of winding paths 22 (such as that shown in FIG. 5) are connected together to form the complete winding arrangement 20. In the embodiments disclosed herein, the winding arrangement 20 includes three phase windings (e.g., phase U windings, phase V windings, and phase W windings) with multiple parallel paths for each phase. In each of FIGS. 1 and 2, the different phases of the winding arrangement are represented by different colors for the sake of clarity and showing the distribution of the various phases throughout the slots 16 of the stator core 12. For example, the phase U windings are shown in as a teal color, the phase V windings are shown as a magenta color, and the phase W windings are shown as a seafoam green color. The three phase windings may be star/wye ("Y") or delta ("Δ") connected, depending on the desired winding configuration.

FIG. 1 shows a view of the winding arrangement 20 positioned on the lead end 26 of the stator core 12. In particular, FIG. 1 shows a first winding head 36 on the lead end 26 including the end turns 40 of multiple coils, and various connections between the coils. As explained in further detail below, the connections between the coils include leads 50 to each individual coil, leads 70 to adjacent coils (see FIG. 5 which specifically shows path leads 70a and 70b), and extended coil connections 60 that extend between pairs of adjacent coils. It will be noted that the path leads 70 are a special type of coil lead 50 (i.e., all path leads 70 are coil leads 50, but not all coil leads 50 are path leads 70 because many coil leads 50 connect coils within a path 22).

Figure 2:
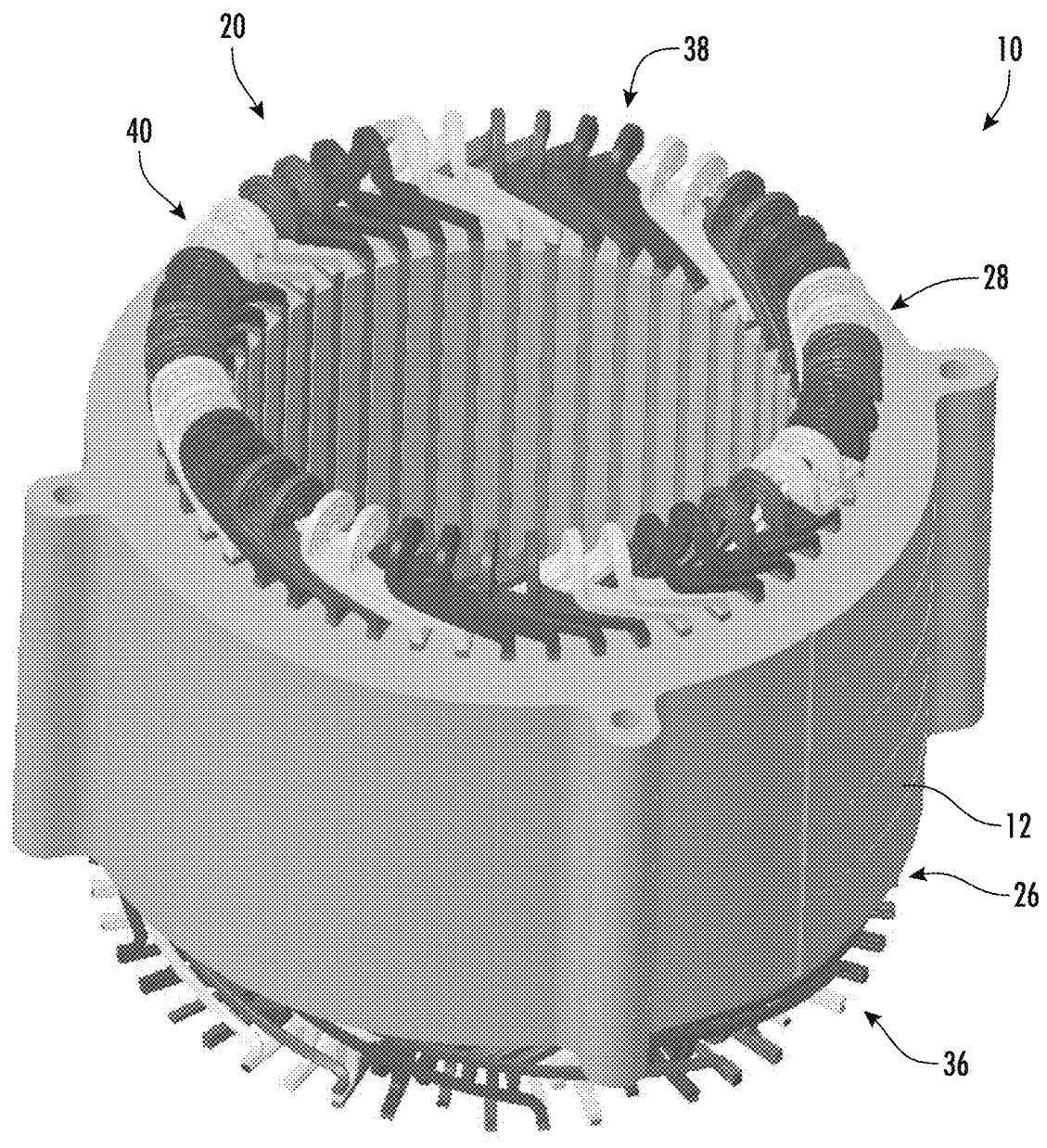
FIG. 2 shows a perspective view of a crown end of the stator of FIG. 1.

FIG. 2 shows a second winding head 38 provided on the opposite end of the stator core from the first winding head 36. As can be seen in FIG. 2, the winding head 38 only includes end turns 40, and does not include, coil leads 50, connection segments 60, or leads 70. Together FIGS. 1 and 2 show the opposite ends 26, 28 of the stator 10 with the winding heads 36, 38 of the winding arrangement 20 positioned on the stator core 12. The in-slot segments 32 of the coils 30 extend through the slots 16 between the respective winding heads 36 and 38.

Figure 6:
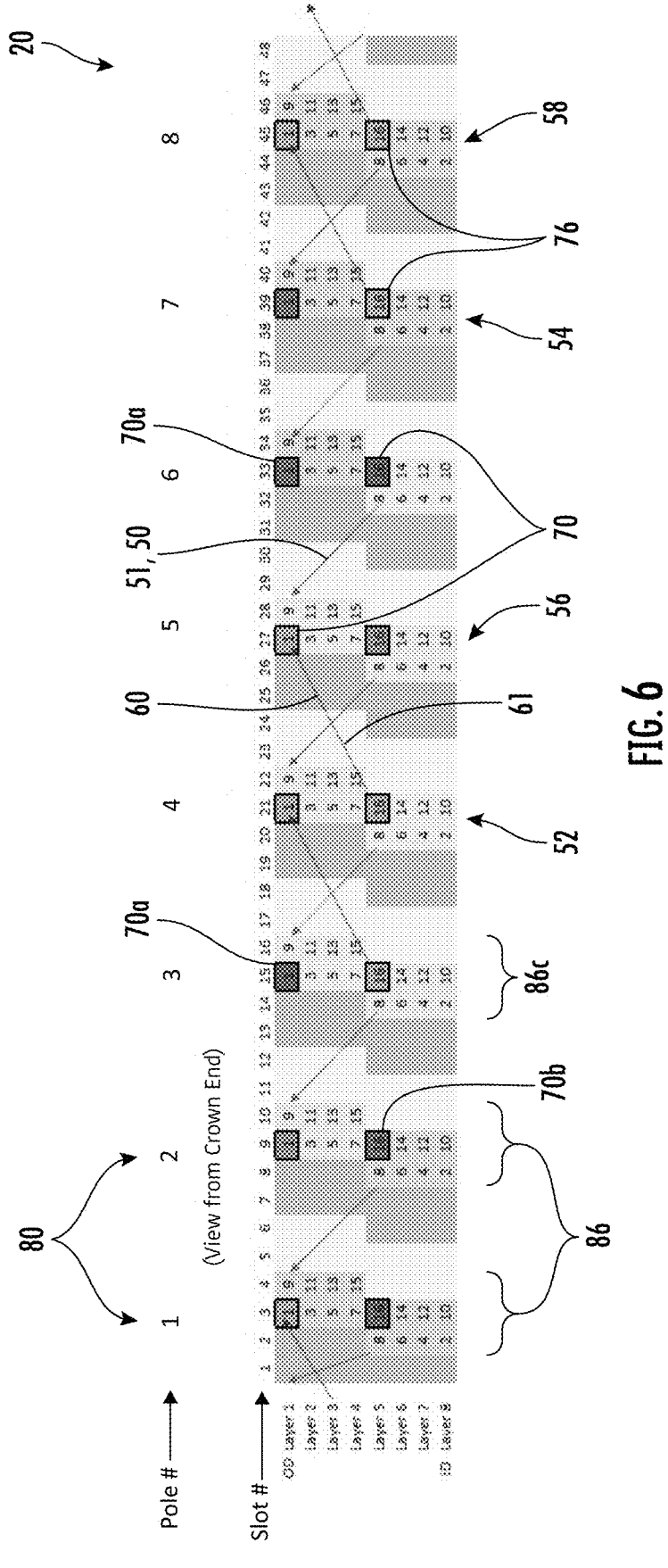
FIG. 6 shows a schematic tabular diagram of the diamond coil winding arrangement of FIG. 1, the diagram illustrating one phase of the winding arrangement with the position of various conductors in the layers of the slots and connections between conductors.

With reference now to FIG. 6 a schematic/tabular view of the winding arrangement 20 is shown with the legs of the diamond-shaped coils arranged in the slots of the stator core. As shown in FIG. 6, forty-eight slots (i.e., slot #1 through slot #48) are included on the core, and each slot includes eight layers of conductors (i.e., eight in-slot segments 32 extend axially through each slot arranged in a single-file in each slot). As noted on the left side of FIG. 6, these eight layers include "Layer 1" (near the outer diameter "OD" of the core) through "Layer 8" (closer to the inner diameter "ID" of the core). For simplicity, only one phase of conductors is shown in FIG. 6, and the core and associated stator slots are represented in a linear manner (i.e., not in the actual annular form).

Each phase of the winding arrangement 20 includes four parallel paths of conductors that form coils 30 as they loop around the slots 16 and the path winds around the core 12. Each color in FIG. 6 represents conductors for one of the four parallel paths for one phase of the winding arrangement. Specifically, these four parallel paths are represented in FIG. 6 as a blue path 52, a green path 54, a yellow path 56, and an orange path 58. The numerals 1-16 are overlaid on each the color of each path 52, 54, 56, 58. The odd numerals (i.e., 1, 3, 5, etc.) within the color represent in-slot conductors associated with a left leg of a diamond-shaped coil 30, and the even numerals within the color (i.e., 2, 4, 6, etc.) represent in-slot conductors associated with a right leg of the same diamond-shaped coil. The end turns 40 that connect the left and right legs of the coils are not represented in FIG. 6, but it will be recognized that the end turns 40 join the in-slot conductors in sequential order to form the coils (e.g., an end turn at the crown end 28 connects conductor 1 to conductor 2, an end turn at the lead end 26 connects conductor 2 to conductor 3, an end turn at the crown end connects conductor 3 to conductor 4, etc.). It will be appreciated from FIG. 6 that all of the coils 30 have a pitch of five (i.e., the left legs of each coil are separated from the right legs by five slots). The coils 30 are also interleaved on the core 12 with left legs (i.e., in-slot segments 32) of each coil positioned in the outer half of the slot layers (i.e., layers 1-4), and right legs of the same coil positioned in the inner half of the slot layers (i.e., layers 5-8).

With the above description in consideration, a path of the winding may be traced using the table of FIG. 6. In order to trace a path (e.g., one of 52, 54, 56 or 58), a lead 70 for the path is first identified by a black box around the conductor numeral "1." For example, the yellow path 56 has a lead 70 in layer #1 of slot 9. From here, a first coil is wound through slot #9 and slot #14 as represented by the sequential conductor numerals 1-8 in those slots (i.e., numerals 1, 2, 3, 4, 5, 6, 7 and 8). A second coil for the yellow path is wound through slot #10 and #15 as represented by the sequential conductor numerals 9-16 (i.e., numerals 9, 10, 11, 12, 13, 14, 15 and 16). The first coil and the second coil are connected in series to form a first pair of adjacent coils for the path. The series connection between the first coil and the second coil is provided by a short jumper connection designated by the blue arrow 51 in FIG. 6, which connects conductor numeral "8" to conductor numeral "9."

As noted above, the blue arrows 51 leaning from right-to-left in FIG. 6 extend between conductors of a single pair of adjacent coils (i.e., from numeral 8 to numeral 9 of a given path). Accordingly, the blue arrows 51 represent coil leads 50 that are connected together to form a pair of adjacent coils. In order to form the short jumper connection (represented by arrow 51) for the first pair of adjacent coils of the yellow path 56, short radially-extending coil leads are provided from the ends of conductors extending from conductor numeral "8" in slot #14 and from conductor numeral "9" in slot #10. It will be recognized that the conductor extending from numeral "8" of slot #14 exits the slot and extends leftward, and the conductor extending from numeral "9" of slot #10 exits the slot and extends rightward. The ends of these two conductors are then positioned at a same general circumferential position on the stator core (e.g., somewhere axially outward from slot #12). At this position, the ends of the conductors are directed radially outward from the end turns 40 and result in coil leads 50 (or jumpers) that are axially and radially aligned. This allows for the coil leads to be easily connected by a weld or other connection that is radially outward from the end turns 40. While the coil leads 50 are illustrated herein by short jumpers that are connected together at positions radially outward from the end turns 40, the coils leads 50 that provide the series connection between adjacent coils may alternatively be provided by lengths of continuous wire that simply extend between the appropriate slots (e.g., between conductor numeral "8" in slot #14 and conductor numeral "9" in slot #10). By using lengths of continuous wire to connect the first pair of adjacent coils in series, the need for the short series weld between the coil leads 50 is eliminated.

After a first pair of adjacent coils is formed for a path, an extended coil connection 60 connects the first pair of adjacent coils to a second pair of adjacent coils. For the yellow path 56 of FIG. 6, the second pair of adjacent coils is illustrated by a third coil for the yellow path wound through slot #21 and slot #26 as represented by the sequential conductor numerals 1-8 in those slots (i.e., numerals 1, 2, 3, 4, 5, 6, 7 and 8), and a fourth second coil for the yellow path wound through slot #22 and #27 as represented by the sequential conductor numerals 9-16 (i.e., numerals 9, 10, 11, 12, 13, 14, 15 and 16). This second pair of adjacent coils is essentially identical in form to the first pair of adjacent coils but is arranged in different slots of the winding arrangement 20. Accordingly, it will be recognized that the each set of conductor numerals 1-16 in FIG. 6 represents a pair of adjacent coils that are connected in series within a given path. The first/leftmost group of numerals 1-16 represent the conductors for a first pair of adjacent coils within the path, and the second/rightmost group of numerals 1-16 represent the conductors for a second pair of adjacent coils within the path (i.e., each of the blue path 52, the green path 54, the yellow path 56, and the red path 58 includes a first pair of adjacent coils and a second pair of adjacent coils).

As noted above, the extended coil connections 60 provide a series connection between the first pair of adjacent coils and the second pair of adjacent coils within each path. These extended coil connections are illustrated in FIG. 6 by the red arrows 61 leaning from left-to-right and extending between the leads of pairs of adjacent coils (i.e., from numeral 16 to numeral 1 of a given path). In order to provide the extended coil connections 60 the end of the conductor numeral 16 for the first pair of adjacent coils of a given path is extended radially outward to provide a coil lead. For example, for the yellow path, the conductor numeral "16" in layer 5 of slot #15 is bent leftward and then radially outward past the end turns 40 to provide a coil lead 50 in the vicinity of slot #13. From this position radially outward from the end turns 40 a jumper connects the end of conductor numeral "16" extending from layer 5 of from slot #15 to the end of conductor numeral "1" extending from layer 1 of slot #21. The jumper that provides the extended coil connection 60 may be easily connected to the coil lead by a weld or other connection that is radially outward from the end turns 40, closer to the outer diameter of the stator core. A view of an exemplary coil connection 60 in isolation from the stator core 12 and other paths of the winding 20 is shown in FIG. 5. As shown in the figure, the jumper that provides the extended coil connection 60 extends along an arc that radially outward from the end turns of the first pair of adjacent coils 30a and the second pair of adjacent coils 30a. The arc extends along a circumferential length that is less than 90°. The jumper further includes a left side terminal end that is axially and radially aligned with the coil lead 50 that extends radially outward from one of the inner layers of conductors. While the extended coil connections 60 are described in the embodiments herein by extended jumpers that are connected together at positions radially outward from the end turns 40, the extended coil connections that provide the series connection between a first pair of adjacent coils and a second pair of adjacent coils within a path may alternatively be provided by lengths of continuous wire that simply extend between the appropriate slots, similar to the manner described herein, but without the need for welds between the coil leads.

The description above discloses the pattern for the yellow path 56 of phase U of the winding arrangement in some detail. It will be recognized that this same pattern is repeated for the blue path 52, the green path 54, and the orange path 58 of phase U in different slots of FIG. 6. Each of those additional paths 52, 54 and 56 is not described in detail herein for the sake of brevity. The phase V and phase W paths are also similar to the phase U paths, with the phase V conductors housed in the light gray slots of FIG. 6, and the phase W conductors housed in the dark gray slots of FIG. 6. Again, the phase V and phase W paths are not described in detail herein for the sake of brevity.

Features of the Winding Arrangement

With continued reference to FIG. 6, additional features of the winding arrangement can be appreciated other than the simple path of the conductors through the slots. For example, it can be seen from FIG. 6 that each phase of the winding arrangement 20 is associated with eight poles 80 (labeled 1-8 above the slot numbers in FIG. 6). Additionally, each pole 80 within a phase of the winding arrangement 20 is associated with a pole slot set 86. In the embodiment of FIG. 6, each pole slot set 86 includes three contiguous slots, and each slot houses eight layers of conductors. Each pole slot set 86 also defines a 4-8-4 conductor arrangement such that four conductors of a first parallel path are arranged in inner layers (i.e., layers 5-8) of the leftmost slot, four conductors of the first parallel path are arranged in inner layers of the middle slot, four conductors of a second parallel path are arranged in outer layers (i.e., layers 1-4) of the middle slot, and four conductors of the second parallel path are arranged in outer layers of the rightmost slot.

Another feature of the winding of FIG. 6 is the number of slots per pole per phase (SPPPP) is equal to two. SPPPP is simply the number of conductors of one phase in one pole divided by the number of conductors per slot (CPS). In FIG. 6 each pole of each phase houses sixteen conductors (e.g., in the pole associated with slot #s 21-23, there are four conductors in slot #20, eight conductors in slot #21 and four conductors in slot #22), and the number of CPS is equal to eight (e.g., 8 conductors in slot #21). Therefore SPPPP=16/8=2.

Furthermore, another feature of the winding arrangement is rotation degree of each parallel path (i.e., the degree of an arc spanned by each parallel path) as well as the placement of the leads of each parallel path. Each parallel path does not span an arc of 360 degrees and stops from completing a complete 360 degrees rotation by at least two poles 80. For example, in FIG. 6, the stator has eight poles 80 but the yellow parallel path has an entry lead in pole #2 (i.e., the lead identified as conductor numeral "1" in slot 9) and an exit lead in pole #5 (i.e., the lead identified as conductor numeral "16" in slot 27). Therefore, as can be seen from FIG. 6, the yellow parallel path is not associated with at least two poles 80, and to be exact—is not associated with 4 poles—because pole #6, pole #7, pole #8 and pole #1 are not associated with the yellow parallel path between the lead 70a of the parallel path to the lead 70b of the parallel path. Consequently, the leads of all the parallel paths are dispersed around a large arc of the stator. For the example of FIG. 6, entry leads 70a exist in pole #2 (i.e., the yellow path entry lead identified by conductor numeral "1" in slot 9), pole #3 (i.e., the blue path entry lead identified by conductor numeral "1" in slot 15), pole #6 (i.e., the green path entry lead identified by conductor numeral "1" in slot 33), and pole #7 (i.e., the orange path entry lead identified by conductor numeral "1" in slot 39), while exit leads 70b exist in pole #1 (i.e., the green path exit lead identified by conductor numeral "16" in slot 3), pole #2 (i.e., the orange path exit lead identified by conductor numeral "16" in slot 9), pole #5 (i.e., the yellow path exit lead identified by conductor numeral "16" in slot 27), and pole #6 (i.e., the blue path exit lead identified by conductor numeral "16" in slot 33). Therefore, the leads 70*a* and 70*b* extend between pole #1 to pole #7, and since eight poles exist in the stator 20, all the leads 70*a* and 70*b* are arranged in an arc that spans essentially 315 degrees (i.e., 7 divided by 8×360°=315°), or in at least some embodiments, an arc that spans at least a 240 degrees around the core 12.

Yet another feature of the winding arrangement is each parallel path includes a first pair of adjacent coils 30*a* that fills the outer half of layers of X pole 80 and the inner half of layers of X+1 pole 80, and a second pair of adjacent coils 30*b* that fills the outer half of layers of Y pole 80 and the inner half of layers of Y+1 pole 80, where Y does not equal X+1. For example, as shown in FIG. 6, a first pair of adjacent coils for the yellow path fills the outer half of pole #2 (i.e., "X pole") and the inner half of layers of pole #3 (i.e., the "X+1" pole), and a second pair of adjacent coils for the yellow path fills the outer half of pole #4 (i.e., the "Y pole") and the inner half of layers of pole #5 (i.e., the "Y+1 pole").

It will be recognized from FIG. 6 that, for each pole slot set 86, two parallel paths of one phase travel through the slots of the pole slot set. For example, pole #3 is associated with pole slot set 86*c*, which includes slot #s 14, 15 and 16. In this pole slot set 86*c*, the yellow path 56 is retained in the inner layers of the leftmost slot (i.e., layers 5-8 of slot #14), the yellow path 56 is retained in the inner layers of the middle slot (i.e., layers 5-8 of slot #15), the blue path 52 is retained in the outer layers of the middle slot (i.e., layers 1-4 of slot #15), and the blue path 52 is retained in the outer layers of the rightmost slot (i.e., layers 1-4 of slot #16). In this pole slot set 86*c*, it will be recognized that the yellow path conductors in layers 5-8 of slot #14 (i.e., the inner layers of the leftmost slot) are associated with a first coil of a first pair of adjacent coils, and the yellow path conductors in layers 5-8 of slot #15 (i.e., the inner layers of the middle slot) are associated with a second coil of the first pair of adjacent coils.

It will be further appreciated from FIG. 6 that the positions of the various paths travel through different slots and different layers of said slots depending on the particular pole slot set. For example, the blue path 52 is (i) retained in the inner layers of the leftmost and middle slots in the pole slot sets associated with poles #4 and #6, and (ii) retained in the outer layers of the middle and rightmost slots in the poles slot sets associated with poles #3 and #5. As another example, the yellow path 56 is (i) retained in the inner layers of the leftmost and middle slots in the pole slot sets associated with poles #3 and #5, and (ii) retained in the outer layers of the middle and rightmost slots in the pole slot sets associated with poles #2 and #4. The other paths, including the green path 54 and orange path 58 also travel through their associated pole slot sets in a similar manner (i.e., arranged in the left, middle, and/or right slots of different pole slot sets and in different layers of the associated slots).

Again, while FIG. 6 specifically shows the parallel paths 52, 54, 56, 58 through the pole slot sets 86 for one phase of the winding arrangement, the pole slot sets for two additional phases of the winding arrangement are also represented in FIG. 6 by the gray shading and white shading (but no numerals). The term "adjacent pole slot sets" as used herein refers to two pole slot sets associated with consecutive/adjacent poles. For example, consecutive poles #5 and #6 in FIG. 6 define adjacent pole slot sets (i.e., the pole slot sets 86 shown in association with pole #5 and pole #6). In the embodiments described herein, the conductors forming each coils are also located in adjacent pole slot sets. How-ever, in at least some embodiments, the conductors forming coils may could be extended such that they are not be located in adjacent pole slot sets.

FIG. 6 also illustrates the extended coil connections 60 that provide series connections between the pairs of adjacent coils 30*a*, 30*b* of the winding arrangement 20. These coil connections 60 are disclosed herein as jumpers that are arranged radially outward from the end turns 40 and extend circumferentially around the end turns (e.g., as shown in FIG. 1). These coil connections 60 are represented in FIG. 6 by red arrows 61 and have a pitch of six. Each red arrow 61 represents a coil connection 60 that connects two different pairs of adjacent coils within a parallel path via a series connection between coil leads extending from layer #5 of one pole and coil leads extending from layer #1 of a different pole. In other words, the red arrows 61 represent coil connections 60 that connect a first coil lead associated with a first pair of adjacent coils coil (which first coil lead extends from a right leg of the first coil and is positioned in an inner layer of a slot—and particularly layer #5) to a second coil lead of a second coil associated with a second pair of adjacent coils (which second coil lead extends from a left leg of the second coil positioned in an outer layer of another slot—and particularly layer #1).

In addition to all of the foregoing, it will also be recognized that FIG. 6 further illustrates the position of the leads 70 for each pair of adjacent coils of the winding arrangement 20. As noted previously, the leads 70 are represented in FIG. 6 by black boxes around the associated conductors and a slightly darker fill color. The leads 70 include outer layer leads 74 (i.e., leads in layer 1 identified by black boxes around the conductor numeral "1") as well as inner layer leads 76 (i.e., leads in layer 5 identified by black boxes around the conductor numeral "16"). A total of sixteen different leads 70 are shown for the winding arrangement 20, including the outer layer leads 74 shown by the eight black boxes around the "1" conductors in layer #1 of each poles, and the inner layer leads 76 shown by the eight black boxes around the "16" conductors in layer 5 of each pole.

FIG. 6 further illustrates the leads for each parallel path of the winding arrangement 20. In particular, the leads 70 in FIG. 6 that do not have an arrow associated with the box (i.e., neither blue arrow 51 nor red arrow 61 extends from or to the associated box) are path leads. For example, leads 70*a* in FIG. 6 are entrance leads to a path, and leads 70*b* are exit leads to a path. It will be recognized that each of the leads 70*a* and 70*b* shown in FIG. 6 are either phase leads or neutral leads for the winding arrangement 20. The leads 70*a* that are part of the outer layer leads 74 (i.e., extending from layer #1) alternate between neutral leads and phase leads. For example, if the path lead 70*a* of pole #2 is a phase lead (i.e., the yellow path lead identified by conductor numeral "1" of slot #9), then the lead 70*a* of pole #3 is a neutral lead (i.e., the blue path lead identified by conductor numeral "1" of slot #15), the lead 70*a* of pole #6 is a phase lead (i.e., the green path lead identified by conductor numeral "1" of slot #33), and the lead 70*a* of pole #7 is a neutral lead (i.e., the orange path lead identified by conductor numeral "1" of slot #45). The path leads 70*b* that are inner layer leads 76 (i.e., extending from layer #5) also alternate between neutral leads and phase leads, but are different from the outer layer leads 74 within each path (i.e., the path leads 70*b* that are inner path leads 76 are either phase leads or neutral leads, whatever is different from the outer layer leads for the same path). For example, if (as noted above) the path-in lead 70*a* of pole #2 is a phase lead (i.e., the yellow path lead identified by conductor numeral "1" of slot #9), then the path-out lead 70*b* of pole #5 is a neutral lead (i.e., the yellow path lead identified by conductor numeral "16" of slot #27).

Figure 7:
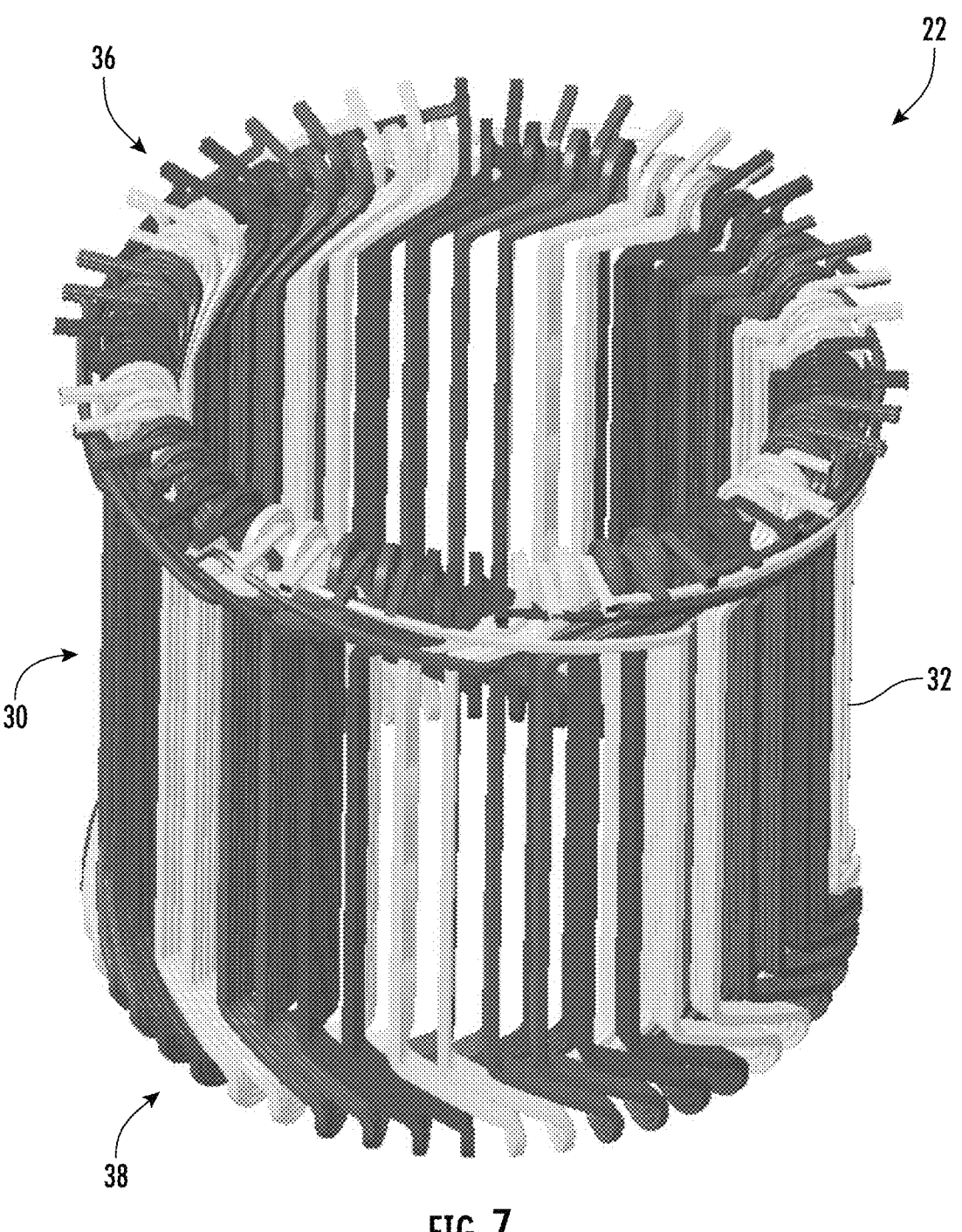
FIG. 7 shows a perspective view of the diamond coil winding arrangement of FIG. 1 in isolation from the stator core.

FIG. 7 shows a perspective view of the complete winding arrangement 20 in isolation from the core 12 in order to illustrate the relative positions and interconnections between the coils. As shown in FIG. 7, each phase of the winding includes eight pairs of adjacent coils. Each parallel path in each phase of the winding 20 is provided by a first pair of adjacent coils connected in series to a second pair of adjacent coils. Accordingly, each phase of the winding includes four parallel paths, each parallel path comprised of two pairs of adjacent coils connected in series by the extended coil connections 60. The coil connections 60 extend circumferentially between the pairs of adjacent coils along the outer diameter (OD).

Alternative Embodiments of the Winding Arrangement

Figures 8, 9:
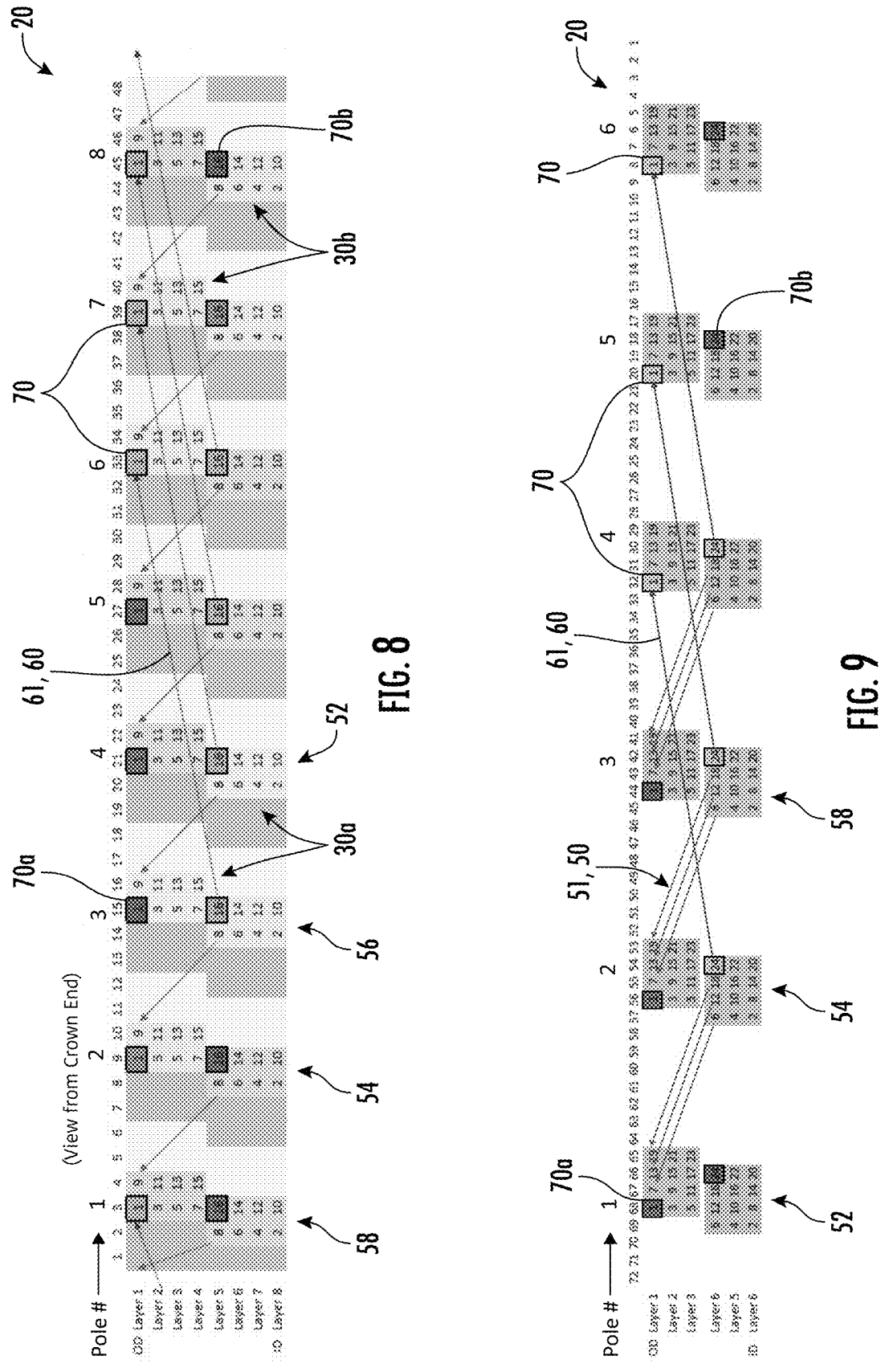
FIG. 8 is schematic tabular diagram of a balanced alternative embodiment of the diamond coil winding arrangement of FIG. 1, the diagram illustrating one phase of the winding arrangement with the position of various conductors in the layers of the slots and connections between conductors.
FIG. 9 is a schematic tabular diagram of another alternative embodiment of the diamond coil winding arrangement of FIG. 1 configured for use in an electric machine having a different number of winding paths per phase and a different number of slots-per-pole-per-phase.

While the stator 10 and winding arrangement 20 have been described herein with particular detail for the embodiment of FIGS. 1-7, it will be recognized that alternative embodiments of the winding arrangement 20 are contemplated. FIG. 8 shows one such alternative embodiment. The embodiment of FIG. 8 is similar to that of FIGS. 1-7, but in the embodiment of FIG. 8, the first pair of adjacent coils 30*a* is separated from the second set of adjacent coils 30*b* to a greater degree. In particular, the first pair of adjacent coils 30*a* is separated from the second pair of adjacent coils 30*b* by about 180°. Accordingly, the jumper that provides the extended coil connection 60 in this embodiment extends along an arc that is greater than 90° but less than 180° (e.g., an arc of about 120° to 150°). Further, for any given parallel path, the number of poles between the path input lead 70*a* and the path output lead 70*b* which are not associated with said parallel path, equals two. For example, for the blue path in FIG. 8, the first pair of adjacent coils 30*a* is associated with pole #3 and pole #4, and the second pair of adjacent coils 30*b* is associated with pole #7 and pole #8. However, the blue path is not associated with pole #5 or pole #6. Thus, two poles (i.e., pole #5 and pole #6) exist between the input path lead 70*a* for the blue path (see numeral "1" in slot #15) and the exit path lead (see numeral "16" in slot #45), with pole #3, pole #4, pole #7 and pole #8 all being associated with the blue path, but pole #5 and pole #6 not associated with the blue path. The embodiment of FIG. 8 has the advantage that the winding arrangement prevents recirculating currents in the event the rotor (not shown) of the electric machine is not precisely centered within the stator 10.

FIG. 9 shows another alternative embodiment of the stator 10 and winding arrangement 20. In this embodiment, the winding arrangement 20 is configured for an electric machine with a greater number of slots per pole per phase. In the exemplary embodiment of FIG. 9, the winding is a three-phase winding with three parallel paths per phase (represented by a blue path 52, a green path 54, and an orange path 58) and four slots per pole per phase. Instead of a first pair and a second pair of adjacent coils connected in series like the embodiments of FIGS. 1-8, the winding of FIG. 9 includes a first set of four adjacent coils connected in series (i.e., multiple pairs of adjacent coils connected in series) and a second set of four adjacent coils connected in series. In this embodiment, the first set of adjacent coils is connected in series to the second set of coils with the first set of adjacent coils being separated from the second set of adjacent coils by about 180°. Also, it will be recognized that the embodiment of FIG. 9 includes six layers of conductors arranged in each slot, and each pole slot set defines a 3-6-6-6-3 conductor arrangement. With this arrangement (i) three conductors of a first parallel path are arranged in inner layers of each of the leftmost slot, a left intermediate slot, the middle slot, and a right intermediate slot, and (ii) three conductors of a second parallel path are arranged in outer layers of each of the left intermediate slot, the middle slot, the right intermediate slot, and the rightmost slot.

Although the various embodiments have been provided herein, it will be appreciated by those of skill in the art that other implementations and adaptations are possible. Furthermore, aspects of the various embodiments described herein may be combined or substituted with aspects from other features to arrive at different embodiments from those described herein. Thus, it will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by any eventually appended claims.

What is claimed is:

1. A stator for an electric machine defining a plurality of poles comprising:
   a core including a plurality of slots; and
   a multi-phase winding arrangement positioned on the core, the multi-phase winding formed of a plurality of diamond coils, and each phase of the winding arrangement comprising at least three parallel paths, wherein one of the at least three parallel paths includes:
      a plurality of coils arranged on the core, each coil defined by coil legs and end turns, the coil legs including left legs and right legs extending through the slots of the core and arranged in layers within the slots, the left legs and the right legs of each coil connected by first end turns at one end of the core and second end turns at an opposite end of the core, the plurality of coils of the parallel path including a first pair of adjacent coils connected in series and a second pair of adjacent coils connected in series, the first pair of adjacent coils and the second pair of adjacent coils associated with four poles of the electric machine;
      an extended coil connection connecting the first pair of adjacent coils and the second pair of adjacent coils in series, and
      wherein at least two poles of a same phase but associated with a different parallel path exist between the first pair of adjacent coils and the second pair of adjacent coils.

2. The stator of claim 1, wherein the at least three parallel paths equals four parallel paths.

3. The stator of claim 2 wherein the at least two poles equals two such that exactly two poles exist between the first pair of adjacent coils and the second pair of adjacent coils.

4. The stator of claim 1, wherein the first pair of adjacent coils includes a left coil and a right coil connected in series by a left coil lead that extends radially outward from the end turns and is connected to a right coil lead that extends radially outward from the end turns.

5. The stator of claim 4, wherein an end of the left coil lead is axially aligned with an end of the right coil lead.

6. The stator of claim 5, wherein the left coil lead is welded to the right coil lead.

7. The stator of claim 1 wherein the extended coil connection extends circumferentially between the first pair of adjacent coils and the second pair of adjacent coils at a position radially outward from the first end turns.

8. The stator of claim 7, wherein the extended coil connection extends along an arc that is greater than 90°.

9. The stator of claim 1, wherein each parallel path extends between a first lead extending from an outer layer of one of said plurality of slots and a second lead extending from an inner layer of one of said plurality of slots.

10. The stator of claim 1 wherein the plurality of parallel paths are associated with a plurality of poles for the stator, wherein each pole of the winding arrangement is associated with a pole slot set including at least three contiguous slots defining at least a leftmost slot, a middle slot and a rightmost slot.

11. The stator of claim 10, wherein eight layers of conductors are arranged in each slot, and wherein each pole slot set defines a 4-8-4 conductor arrangement such that four conductors of a first parallel path are arranged in inner layers of the leftmost slot, four conductors of the first parallel path are arranged in inner layers of the middle slot, four conductors of a second parallel path are arranged in outer layers of the middle slot, and four conductors of the second parallel path are arranged in outer layers of the rightmost slot.

12. The stator of claim 10, wherein six layers of conductors are arranged in each slot, and wherein each pole slot set defines a 3-6-6-6-3 conductor arrangement such that (i) three conductors of a first parallel path are arranged in inner layers of each of the leftmost slot, a left intermediate slot, the middle slot, and a right intermediate slot, and (ii) three conductors of a second parallel path are arranged in outer layers of each of the left intermediate slot, the middle slot, the right intermediate slot, and the rightmost slot.

13. The stator of claim 1 wherein the adjacent coils are formed from one contiguous wire.

14. The stator of claim 1 wherein the first parallel path fills an outer half of X pole and an inner half of X+1 pole, and an outer half of Y pole and an inner half of Y+1 pole, where Y does not equal X+1.

15. A stator for an electric machine comprising:
a core including a plurality of slots; and
a multi-phase winding arrangement positioned on the core, each phase of the winding arrangement comprising four at least three parallel paths, each parallel path including at least a first pair of adjacent coils connected in series, a second pair of adjacent coils connected in series, and an extended connection connecting the first pair of adjacent coils and the second pair of adjacent coils in series,
wherein at least two poles of a same phase associated with the at least three parallel paths exist between the first pair of adjacent coils and the second pair of adjacent coils;
wherein coils forming the first pair of adjacent coils and the second pair of adjacent coils are diamond shaped coils;
wherein each of the at least three parallel path includes an entry lead and an exit lead; and
wherein the entry leads and the exit leads of all of the at least three parallel paths of each phase are arranged along an arc that spans at least 240 degrees around the core.

16. The stator of claim 15, wherein the entry leads and the exit leads of all of the at least three parallel paths of each phase are arranged along an arc that spans 315 degrees around the core.

17. The stator of claim 16, wherein the first pair of adjacent coils includes a left coil and a right coil connected in series by a left coil lead that extends radially outward from end turns of the first pair of adjacent coils and is connected to a right coil lead that extends radially outward from the end turns of the first pair of adjacent coils,
wherein the second pair of adjacent coils includes a left coil and a right coil connected in series by a left coil lead that extends radially outward from end turns of the second pair of adjacent coils and is connected to a right coil lead that extends radially outward from the end turns of the second pair of adjacent coils, and
wherein the extended connection extends circumferentially along an arc that is radially outward from the end turns of the first pair of adjacent coils and the second pair of adjacent coils.

18. The stator of claim 15, wherein the adjacent coils are formed from one contiguous insulated wire.

19. The stator of claim 15 wherein the first parallel path fills an outer half of X pole and an inner half of X+1 pole, and an outer half of Y pole and an inner half of Y+1 pole, where Y does not equal X+1.

20. A stator for an electric machine comprising:
a core including a plurality of slots; and
a multi-phase winding arrangement positioned on the core, each phase of the winding arrangement comprising a plurality of parallel paths,
wherein each parallel path is comprised of a plurality of adjacent coils connected in series, the plurality of adjacent coils of each parallel path including at least a first pair of adjacent coils and a second pair of adjacent coils, wherein an extended coil connection connects the first pair of adjacent coils and the second pair of adjacent coils in series,
wherein each phase of the winding arrangement is associated with a plurality of poles and each pole is associated with a pole slot set including at least a leftmost slot, a middle slot, and a rightmost slot, wherein at least two pole slot sets associated with a same phase as the first pair of adjacent coils and the second pair of adjacent coils are located between the first pair of adjacent coils and the second pair of adjacent coils; and
wherein, for each pole slot set, (i) coil legs of a first parallel path are positioned in a first half of layers of the leftmost slot and in the first half of layers of the middle slot, and (ii) coil legs of a second parallel path are positioned in a second half of layers of the middle slot and the second half of layers of the rightmost slot.

21. The stator of claim 20, wherein the first half of layers are inner layers, wherein the second half of layers are outer layers, and wherein eight layers of conductors are arranged in each slot.

22. A stator for an electric machine defining a plurality of poles comprising:
a core including a plurality of slots; and
a multi-phase winding arrangement positioned on the core, the multi-phase winding formed of a plurality of diamond coils, and each phase of the winding arrangement comprising at least three parallel paths associated with a plurality of poles for the stator, wherein one of the at least three parallel paths includes:
a plurality of coils arranged on the core, each coil defined by coil legs and end turns, the coil legs including left legs and right legs extending through the slots of the core and arranged in layers within the slots, the left legs and the right legs of each coil connected by first end turns at one end of the core and second end turns at an opposite end of the core, the plurality of coils of the parallel path including a first pair of adjacent coils connected in series and a second pair of adjacent coils connected in series, the first pair of adjacent coils and the second pair of adjacent coils associated with four poles of the electric machine;

an extended coil connection connecting the first pair of adjacent coils and the second pair of adjacent coils in series, and an entry lead at one end of the parallel path and an exit lead at the opposite end of the parallel path, wherein at least two poles associated with the parallel path exist between the entry lead and the exit lead;

wherein each pole of the winding arrangement is associated with a pole slot set including at least five contiguous slots defining at least a leftmost slot, a left intermediate slot, a middle slot, a right intermediate slot, and a rightmost slot; and wherein six layers of conductors are arranged in each slot, and wherein each pole slot set defines a 3-6-6-6-3 conductor arrangement such that (i) three conductors of a first parallel path are arranged in inner layers of each of the leftmost slot, a left intermediate slot, the middle slot, and a right intermediate slot, and (ii) three conductors of a second parallel path are arranged in outer layers of each of the left intermediate slot, the middle slot, the right intermediate slot, and the rightmost slot.

\* \* \* \* \*